April 17, 1962   H. KENT   3,029,508
METHOD OF MAKING CORRUGATED FLEXIBLE WAVE GUIDE
Filed April 29, 1958

Inventor:
Howard Kent
By Dudley B. Howard
Attorney

United States Patent Office 3,029,508
Patented Apr. 17, 1962

3,029,508
METHOD OF MAKING CORRUGATED FLEXIBLE WAVE GUIDE
Howard Kent, Rte. 94, Newton, N.J.
Filed Apr. 29, 1958, Ser. No. 731,678
1 Claim. (Cl. 29—534)

The invention relates in general to longitudinally seamed flexible wave guides of rectangular cross-section having transversely corrugated side walls which are used to make a flexible connection between rigid wave guides or other elements of a high frequency (very high frequency through extremely high frequency) electric current transmission line, and has particular reference to the method of making such a flexible guide.

The type of wave guide to which the invention relates is disclosed in United States Patent No. 2,600,169 issued to John M. Lamb on June 10, 1952. In fact, the present invention is a specific improvement in the method employed to corrugate the lap joint seam areas of the walls of the wave guide disclosed in said patent, which, for clarity of reference, will be referred to hereinafter as "the said patented wave guide."

Prior to my present invention, it has been practice in fabrication of the said patented wave guide to corrugate the wide flat strip, or blank, throughout its complete area except at one or both end portions thereof before bending it into tubular form and uniting the meeting longitudinal edges by a lap joint brazed or soldered seam. In consequence of this mode of fabrication, particularly when the seam extends along the center line of a broad side wall, the guide is degraded electrically because of reflections set up by the small variations in the stretch of the seam. This generally is caused by bridging of the convolutions by braze or solder of the seam, or by variations in the anneal of the seam. Although in the smaller size guides the corrugations and seams are quite small and the cavities between adjacent protuberances are of capillary dimensions, the bridging and electrical degradation will be proportionately increased.

It, therefore, is the primary object of my present invention to remove the causes of electrical degradation by providing an improved method of fabrication.

Other objects, advantages and features will become apparent as the following specific description is read in connection with the accompanying drawing, in which.

Figure 1:
FIG. 1 is a fragmentary plan view of the flat metallic strip, or blank, after being initially corrugated except in the marginal seam areas.

Referring now in detail to the accompanying drawing, wherein like reference characters designate corresponding parts in the several views, the flat strip, or blank 10 of conducting metal is represented in FIG. 1 in its partially corrugated condition following the first step of my improved method of fabrication which consists in stamping or otherwise forming transverse corrugations 11 continuously along all portions of the blank except the longitudinal marginal or side edge areas 12—12 that are to be united by braze or solder in a lap joint type of seam.

Figure 2:
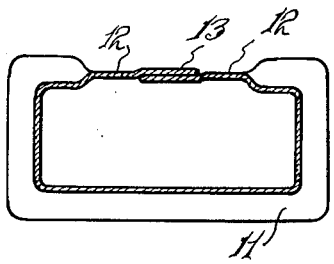
FIG. 2 is a transverse section of the wave guide following in-bending of the side portions and completion of the seam but before corrugation of the latter.

FIG. 2 shows the partially formed wave guide after being bent transversely inward into tubular form in the second step and having the overlapping portions 12—12 permanently united in a seam 13 in the third step.

Figure 3:
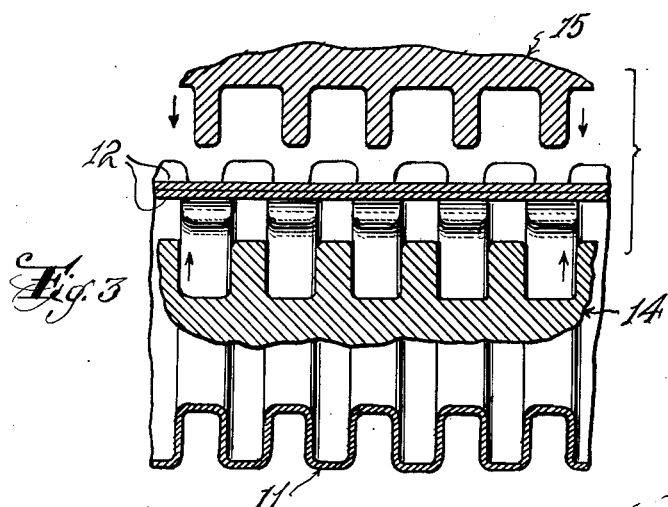
FIG. 3 is a longitudinal section, showing operation of mated dies in corrugating the seam.

FIG. 3 shows the final or fourth step, which consists in formation of corrugations in seam portions 12—12 by application of inside and outside dies 14 and 15, respectively, in a manner well known to mechanics skilled in the art.

Practice of the improved method of fabrication will produce such smooth continuity of the transverse corrugations in the seam area that undesired electrical degradation will be eliminated.

It will be understood that it is intended to cover all changes and modifications of the example of the invention herein chosen for the purpose of illustration which do not constitute departures from the spirit of the invention and scope of the appended claims.

I claim:

The method of fabricating a flexible corrugated wave guide of substantially rectangular cross-sectional tubular form having corrugations whose ridges and valleys extend at right angles to the longitudinal axis of said wave guide which consists in a first step of corrugating an elongated rectangular flat strip of electrically conducting metal to form corrugations whose ridges and valleys extend at right angles to the longitudinal side edges of said strip and terminate short of said edges to leave flat seam portions extending longitudinally in marginal relation thereto; a second step in which the partially corrugated strip is transversely in-bent into tubular form with the flat seam portions located substantially in one side wall of the wave guide and with the corrugations initially formed arranged with their ridges and valleys at right angles to the longitudinal axis of the wave guide; a third step in which the flat longitudinal seam portions of the strip are overlapped and electrically and mechanically closed by formation of a permanent seam; and a fourth step in which the seam is corrugated transversely with corrugations whose ridges and valleys are arranged at right angles to the longitudinal axis of the wave guide and in matching relation to the initially corrugated areas of the strip by die registration contact with the latter.

References Cited in the file of this patent
UNITED STATES PATENTS

| 365,466 | Fox | June 28, 1887 |
| 607,620 | Kemp | July 19, 1898 |
| 697,955 | Thompson | Apr. 15, 1902 |
| 916,501 | Taylor | Mar. 30, 1909 |
| 976,060 | Fulton | Nov. 15, 1910 |
| 2,600,169 | Lamb | June 10, 1952 |